United States Patent
Maltsev et al.

(10) Patent No.: US 8,340,579 B2
(45) Date of Patent: *Dec. 25, 2012

(54) TECHNIQUES FOR MMWAVE WPAN COMMUNICATIONS WITH HIGH-DIRECTIONAL STEERABLE ANTENNAS COMBINING OMNI-DIRECTIONAL TRANSMISSIONS WITH BEAMFORMING TRAINING

(75) Inventors: Alexander Maltsev, Nizhny Novgorod (RU); Alex Kesselman, San Jose, CA (US); Roman Maslennikov, Nizhny Novgorod (RU); Alexander Maltsev, Jr., Nizhny Novgorod (RU); Alexey Khoryaev, Dzerzhinsk (RU); Mikhail Shilov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,769

(22) Filed: Jan. 12, 2012

(65) Prior Publication Data
US 2012/0115419 A1    May 10, 2012

Related U.S. Application Data

(63) Continuation of application No. 13/154,070, filed on Jun. 6, 2011, which is a continuation of application No. 12/317,177, filed on Dec. 18, 2008, now Pat. No. 8,095,069.

(60) Provisional application No. 61/035,480, filed on Mar. 11, 2008.

(51) Int. Cl.
H04B 7/00    (2006.01)
(52) U.S. Cl. .................... 455/41.2; 455/63.4
(58) Field of Classification Search .......... 455/63.4
See application file for complete search history.

(56) References Cited

U.S. PATENT DOCUMENTS

| 8,040,831 | B2 | 10/2011 | Kurtz et al. |
| 8,095,069 | B2 | 1/2012 | Maltsev et al. |
| 2008/0095072 | A1* | 4/2008 | Shao et al. .............. 370/254 |

OTHER PUBLICATIONS

Office Action Received for U.S. Appl. No. 12/317,177, mailed on May 25, 2011, 7 pages.
Notice of Allowance Received for U.S. Appl. No. 12/317,177, mailed on Sep. 22, 2011, 5 pages.
Office Action Received for U.S. Appl. No. 13/154,070, mailed on Mar. 7, 2012, 7 pages.
Notice of Allowance Received for U.S. Appl. No. 13/154,070, mailed on Apr. 23, 2012, 9 pages.

* cited by examiner

Primary Examiner — Steven J Mottola
(74) Attorney, Agent, or Firm — Ellis B. Ramirez

(57) ABSTRACT

An embodiment of the present invention provides a method for communicating in a millimeter wave (MMWAVE) wireless personal area network (WPAN) system using a reliable low-rate omni-directional communications mode implemented as TX-RX space scanning using directional antennas; and using a high-rate directional communications mode with beamformed directional antennas.

15 Claims, 2 Drawing Sheets

TECHNIQUES FOR MMWAVE WPAN COMMUNICATIONS WITH HIGH-DIRECTIONAL STEERABLE ANTENNAS COMBINING OMNI-DIRECTIONAL TRANSMISSIONS WITH BEAMFORMING TRAINING

CROSS REFERENCED TO RELATED APPLICATIONS

This application is a continuation of U.S. patent application Ser. No. 13/154,070, filed on Jun. 6, 2011, which is a continuation of U.S. patent application Ser. No. 12/317,177 filed on Dec. 18, 2008 (now U.S. Pat. No. 8,095,069). U.S. patent application Ser. No. 12/317,177 claims the benefit under 35 U.S.C. §119(e) to U.S. Provisional Patent Application No. 61/035,480, filed Mar. 11, 2008. U.S. patent application Ser. No. 13/154,070, U.S. patent application Ser. No. 12/317,177, and U.S. Provisional Patent Application No. 61/035,480 are incorporated herein by reference in their entirety.

BACKGROUND

Wireless Personal Area Networks (WPAN) communication systems are extensively used for data exchange between devices over short distances of no more than 10 meters. Current WPAN systems exploit the frequency band in the 2-7 GHz frequency band region and achieve throughputs of up to several hundred Mbps (for Ultra-WideBand systems).

The availability of 7 GHz of unlicensed spectrum in the 60 GHz band and the progress in the RF IC semiconductor technologies are pushing the development of the millimeter-Wave (mmWave) WPAN systems which will operate in the 60 GHz band and will achieve the throughputs of about several Gbps. Currently a number of standardization groups (Institute for Electronic and Electrical Engineers (IEEE) 802.15.3c, Wireless HD SIG, ECMA TG20) are working on the development of the specifications for such mmWave WPAN networks. The standards are developed mainly as addendums to the previous WPAN standards with the introduction of new PHY layers and also are trying to reuse most of the MAC functionality. However, the modifications to the MAC layer are also required to exploit specific mmWave WPAN characteristics.

One of these characteristics is that future mmWave WPAN will widely use directional antennas. The high gain of the directional antennas will be required to achieve the necessary signal to noise ratio (SNR) margins over very wide bandwidth (~2 GHz) mmWave WPAN links under the limited (~10 dBm) transmitted power. The high-gain antennas will have to be steerable in order to support arbitrary placement of different devices (e.g. to not be limited to fixed positions).

Thus, a strong need exists for techniques and improvements in directional communication establishment for WPANs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
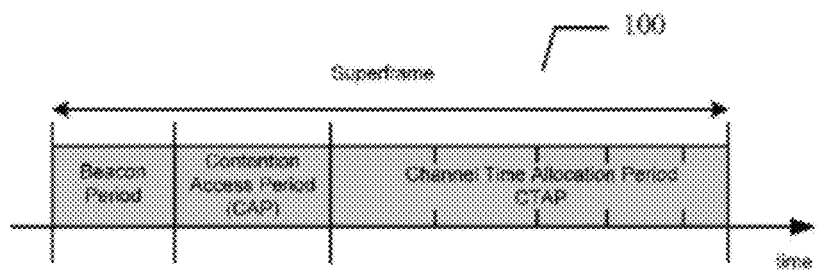
FIG. 1 illustrates a superframe structure of the current IEEE 802.15.3 standard.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although not limited in this respect, embodiments of the present invention provide mmWave WPAN systems based on the IEEE 802.15.3 and IEEE 802.15.3b specifications but with the introduction of the support of the beam steerable directional antennas. Further, embodiments of the present invention may provide mmWave WPAN systems with omni-directional low-rate and directional high-rate modes only. The omni-directional low-rate frame may be used for the dual purpose of carrying the minimal service information between nodes and simultaneously performing the beamforming training of the link. This may provide minimum overhead on the PHY and MAC layers for mmWave WPAN systems with steerable directional antennas relative to the traditional IEEE 802.15.3 WPANs.

According to the current IEEE 802.15.3-2003 and IEEE 802.15.3b-2005 standards, the channel time in the piconet is divided into superframes, with each superframe consisting of the three major parts—beacon period, Contention Access Period (CAP) and Channel Time Allocation Period (CTAP) as it is shown generally as 100 of FIG. 1.

The beacon period is used by the PNC to transmit the management information to the devices. The beacon frame is common for all devices. The CAP period is used for random contention-based access and may be used for MAC commands, acknowledgement and data frames transmission. The CTAP is usually the largest part of the superframe and it is divided by the PNC into time slots allocated for data transmission between different nodes (DEVs) in the Time Division Multiple Access (TDMA) mode.

Embodiments of the present invention provide mmWave WPANs that use steerable high directional antennas which may be required to achieve an operational range of 10+ meters, although the present invention is not limited in this respect. The application of the high directional steerable antenna gives rise to a number of issues relatively to the traditional WPAN and WLAN systems operating in the lower frequency bands.

These issues are related to the fact that to realize a fully-functional link between TX and RX sides in such systems, the TX and RX antennas should be optimally steered towards each other. So before the start of transmit or receive operations, a pair of communicating stations should adjust their antenna patterns towards each other if there is a line-of-sight (LOS) propagation path or towards some reflective object if the LOS path is blocked in order to achieve a required receive power level; otherwise the transmitted signal cannot be detected and correctly decoded by the RX stations. To adjust the TX and RX antennas of devices, a beamforming transmission format (mode) has to be defined to be able to evaluate the space-time channel between transmitter and receiver sides.

If the reciprocity principle is not used, then the antenna adjustment parameters (i.e. weight vector, sector number and others) need to be communicated back from RX to TX so that the directional link may be established between TX and RX stations. In this case other transmission modes (different from steady-state directional link) has to be used to send the feedback information.

Such mode for beamforming feedback (and other service information transmissions) may have significantly lower throughput than the beamformed mode and may be realized in the same frequency band or in the other frequency band. Herein it is assumed that such mode has to be implemented in the same mmWave band as a low-rate omni-directional transmission. The link budget analysis for such an omni-directional transmission shows that only data rates of 10 Mbps or lower may be supported in this mode for operation of up to 10 meters.

So the mmWave WPAN system with steerable directional antennas formally should have three different operation modes: high-rate directional mode, low-rate omni-directional mode and also some dedicated transmission format (mode) for the antenna beamforming training.

The basic approaches for implementation of the low-rate omni-directional system for the mmWave WPAN stations supporting steerable directional antennas are the following:

Creation of omni-directional antenna patterns (e.g. by using one antenna element of the array) on both TX and RX stations and performing low-rate transmissions in the narrowband using repetition and low-rate coding;

Emulation of the low-rate mode by transmission to all TX directions and reception from all RX directions in the high-rate mode; and Combination of the two above mentioned approaches in different ways (e.g. using switched directional TX transmission and omni-directional RX reception or vice versa).

It should be understood, that from the theoretical point of view (SNR-based analysis), all of these approaches are almost equivalent and require approximately the same amount of time. So the advantages of the technical implementation of one approach over the other are not so evident. One embodiment of the present invention provides that the second approach, exploiting TX-RX antenna space scanning is more advantageous because it will allow operation in the positive SNR regime during the interval when the TX and RX antennas are in the right positions. The first approach with the true omni-directional transmission will require that the initial operation in the negative SNR regime, which may have several drawbacks from technical point of view.

The other advantage of the second approach using TX-RX space scanning is the following. As it is described above, the beamforming training procedure (for establishing directional link) physically requires transmission to all directions and reception from all directions (for every TX direction) to make the full channel evaluation. Therefore the transmission format may be the same for beamforming training and for low-rate omni-directional transmission based on TX-RX space scanning. Embodiments of the present invention propose to exploit this fact when creating the mmWave WPAN system architecture and defining the superframe format.

Embodiments of the present invention provide the implementation of the low-rate omni-directional mode using the TX-RX space scanning so that the same frame may be used for carrying the low-rate frame and performing the beamforming training of directional antennas simultaneously. The preliminary estimate is that a low-rate frame with duration of approximately 100 µs will be able to perform full beamforming training and carry approximately 100 bytes of service information. Below these parameters are used as a base for superframe format definition.

The low-rate omni-directional mode should be used as minimally as possible. It is proposed to use it only for the minimal set of MAC/PHY functions which are required before switching to the directional mode and perform all other communications in the directional mode only. Such minimal set of PHY/MAC functions may include:

Low-rate omni-directional beacon;
Low-rate association request command;
Beamforming training frame;
Beamforming retraining request;

Also other functions may be implemented with the low-rate frames if it is required for mmWave WPAN system design.

All other information (all data and most of the control information) except for the minimum set has to be transmitted in the high-rate directional mode.

The WPANs that include a PNC and subordinate DEVs usually require a lot of control information to be transmitted from the PNC to DEVs, which may include allocation of transmission periods for different DEVs, MAC commands, information about the current piconet, required for other devices to associate with the PNC, and also other information. The principle of sending only minimum information in the low-rate omni-directional mode also applies to the control data transmitted in the beacon frames. So embodiments of the present invention provide exploiting two types of beacon frames in the system—low-rate omni-directional beacon frames and high-rate directional beacon frames.

Low-rate omni-directional beacons should carry only a minimum information required by devices that are not associated and require association with the network and also information for devices that are associated with the piconet but have lost beamformed connection to the PNC.

The high-rate directional transmission should be used for transmission of beacons to all DEVs that have a high-rate directional connection to the PNC. Legacy systems (like IEEE 802.15.3 and IEEE 802.15.3b) that do not exploit directional antennas use the same beacons for all stations because they can be transmitted one time per superframe and received by all stations in the piconet. Exploitation of high directional antennas will require sending beacon frames several times to different DEVs so that DEVs could receive directional beacons. So embodiments of the present invention may provide using directional beacon frames transmitted to the directions of the required DEV to send control information from PNC to the DEV. Since the directional beacons to different DEVs are transmitted separately, embodiments of the present invention provide using individual directional beacon frames for different DEVs so that the directional beacon frame for the specific DEV includes only the information relevant to this DEV. This will allow reducing the total amount of information to be transmitted using directional beacons.

Also each DEV usually has some control information to be sent back to the PNC. Embodiments of the present invention may provide sending this information using feedback frames that are sent in the high-rate directional mode immediately after reception by the DEV of the directional beacon frame.

After completion of the exchange of the directional beacon and feedback frames, the PNC may get some additional information that has to be delivered to some DEVs with low latency. For example and not by way of limitation, in the feedback frame, the DEV may request additional time for transmission of some data that has to be delivered with low latency. The PNC may allocate some time interval for this transmission and this interval may be placed before the next directional beacon—feedback frames exchange that is especially important for latency critical data. For such a situation, embodiments of the present invention provide using announcement frames that are sent in the high-rate directional mode individually from the PNC to some DEVs after the completion of the exchange of the directional beacon and feedback frames with all associated DEVs in the piconet.

The other important consequence of using two transmission modes—low-rate omni-directional mode implemented as TX-RX space scanning and high-rate directional mode with a beamformed transmission—is that these modes have substantially different probabilities of interference between transmissions of different pairs of stations. The highest probability of interference is between two low-rate omni-directional transmissions. The probability of interference between the low-rate omni-directional transmissions and high-rate directional transmission is smaller but is still substantial. Two high-rate directional transmissions have a low probability of interference. The property of low probability of interference between high-rate directional transmissions of different pairs of stations may be used for applying spatial frequency reuse when several pairs of stations are scheduled by for parallel transmission at the same time period.

The interference environment within one piconet is controlled by the PNC by scheduling different transmissions to different time periods. But the interference may also arise from other piconets operating in parallel. This is especially present for dense deployments of the WPAN systems. If the superframes lengths of different piconets are equal or a multiple of each other and different types of transmissions happen at the same time periods in the superframe, then the PNC may adapt its transmission schedule to mitigate negative impact of the interference.

To make the PNC adaptation mechanisms more effective, embodiments of the present invention provide that if possible, the PNCs place all low-rate omni-directional transmission periods and high-rate directional transmission periods in adjacent (consecutive) time intervals so that the number of transitions from the high-rate directional mode to low-rate omni-directional mode is minimized when measured at the duration of several superframes.

1. Proposed Structure of Superframe

Figure 2:
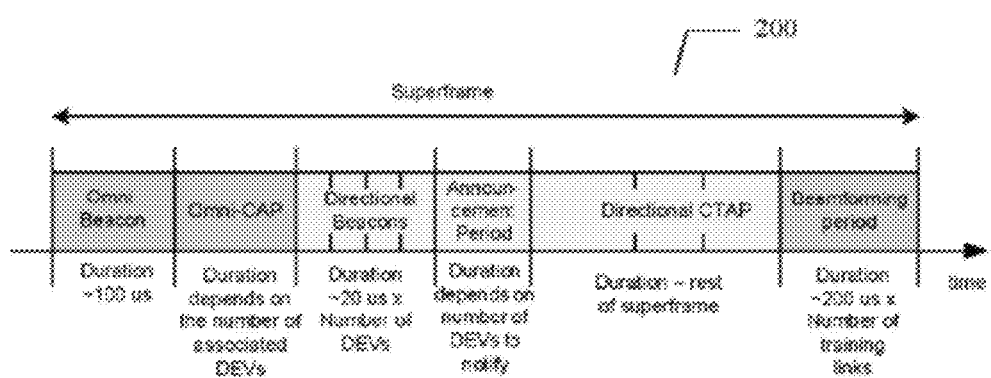
FIG. 2 illustrates a proposed structure of a superframe for mmWave WPAN systems according to embodiments of the present invention.

The proposed superframe structure includes Omni-Beacon Period, Omni-Contention Access Period (Omni-CAP), Directional Beacons Period, Announcement Period, Directional Channel Time Allocation Period (Directional CTAP) and Beamforming Period. The block diagram of the proposed frame structure is shown generally as 200 of FIG. 2.

2. Omni-Beacon Period

Omni-beacon period is used by the PNC to transmit the omni-beacon in the low-rate mode. The omni-beacon carries minimum amount of the information including PNC address, several TX parameters and position of the omni-CAP period. The omni-beacon is primarily used by the devices which are entering the piconet or which have lost the directional (beamformed) connection to the PNC and need to reestablish it. The Omni-Beacon period is used by DEVs that do not have the beamformed connection to the PNC to receive a minimum amount of control information required to establish the beamformed connection and also to perform beamforming training of the PNC to the DEV communication link. Also, the omni-beacon may be used by other devices to adjust their antenna settings from the device (DEV) to the PNC directional link.

The estimated length of the omni-beacon period may be about 100 μs (to send one low-rate frame).

Omni-CAP Period

The contention access of several DEVs should be also done in the low-rate mode because the high-directional RX antenna of the PNC cannot listen to multiple directional transmissions simultaneously. The Omni-CAP period is dedicated for:

low-rate association frames carrying information about the DEV address and the minimal beamforming information (e.g. TX sector number to use by the PNC for this DEV) required to create a beamformed link from the PNC to the DEV low-rate beamforming retraining request frames which are sent by the DEVs which lost connection to the PNC and require to reestablish their beamformed directional connection with the PNC.

The PNC receives the low-rate association control frames or low-rate beamforming control frames from DEVs and simultaneously performs beamforming training of the DEV to PNC link.

The duration for the Omni-CAP may be made variable and contain different number of time slots depending on the following factors:

Environment—the probability of the new DEVs entering the network may depend on the type of environment—e.g. residential or office environment;

Number of the associated DEVs—the probability of the event that some DEV will lose a beamformed connection with the PNC and will require sending a omni-directional beamforming retraining request frame will be higher for the large number of the associated DEVs;

It is estimated that the duration of the typical Omni-CAP should be equal to approximately 200-300 μs.

The Clear Channel Assessment (CCA) PHY procedure used during the Omni-CAP has to be modified relative to the traditional low-band WPANs to be able to detect the omni-directional reception implemented with the TX-RX space scanning.

4. Directional Beacons Period

The Directional Beacon Period is divided into the slots with the number of slots equal to the number of the associated DEVs in the piconet. Within each slot, the PNC sends a directional beacon dedicated to a specific DEV using the directional high-rate mode. After that the PNC gets a feedback frame from the same DEV transmitted in the high-rate directional mode.

Such frames exchange is used to transmit the largest part of the service information between PNC and the DEV. The information sent by the PNC includes schedule of the DEV transmissions in CTAP, commands to perform beamforming training, measure the interference level and others. The information communicated by the DEV in the feedback message to the PNC includes channel time requests, interference level for spatial reuse mode and other information.

Directional beacons and DEV responses are both transmitted in the high-rate directional mode. The length of the single slot required for PNC to send beacon and also for the DEV to send a response is estimated as ~20 μs, although the present invention is not limited to this length.

The DEV which has just sent the association request in the previous Omni-CAP has to listen to all the directional beacons until it receives a directional beacon from the PNC dedicated to this specific DEV. The other DEVs which are already associated with the piconet may be aware of the position of their slot in the Directional Beacons period and use this information for their operation optimization.

5. Announcement Period

As it was described in the previous section, the PNC tells the DEVs about the schedule of their CTAP transmission in the directional beacons. The DEV sends the response to the PNC after it gets a directional beacon. So if the DEV asks for an additional channel time in the response to the PNC, then the PNC may take this request into account only in the next directional beacon in the next superframe. If the superframe length is large and if the DEV has latency sensitive data to transmit, then such delay may adversely impact the performance of the application sending such latency-critical data.

To avoid these situations the optional announcement period is introduced. This period is placed after the directional beacons period. If the DEVs have requested the additional channel time in the same superframe from the PNC then these DEVs have to listen in the directional mode the Announcement period which is placed after the end of the Directional Beacons period. If the PNC manages to allocate additional required time slots for the requesting DEVs, then it announces additional schedules to these DEVs in the Announcement Period using dedicated frames transmitted to each requesting DEV in the high-rate directional mode.

6. Beamforming Period

The beamforming period is used to perform beamforming training between different DEVs. Before start of the high-rate communication between any two DEVs they have to complete the beamforming training.

The beamforming training is done using the omni-directional low-rate transmission format. The timeslot from beamforming training period is requested by the DEV from the PNC. The approximate time required to complete training for one bidirectional link between two devices is ~200 μs and includes time for two low-rate beamforming training frames to perform training in both directions.

Figure 3:
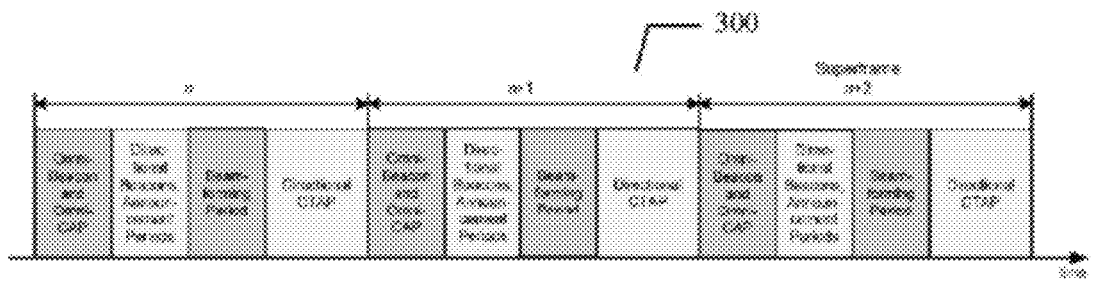
FIG. 3 illustrates several superframes when the beamforming period is placed after an announcement period according to one embodiment of the present invention.

The PNC makes a decision about the position of the Beamforming period inside of the superframe. The Beamforming period may be placed immediately after the Announcement period or at the end of the superframe after the Directional CTAP as it is shown generally as 300 of FIGS. 3 and 400 of FIG. 4 respectively. Both allocations (positions) of the Beamforming periods have some advantages and disadvantages.

If the Beamforming period is placed after the Announcement period then it will allow for a pair of devices to perform the beamforming and then transmit during the Directional CTAP within the same superframe and thus to minimize latency relatively to the case if the Beamforming period is placed at the end of the superframe.

Figure 4:
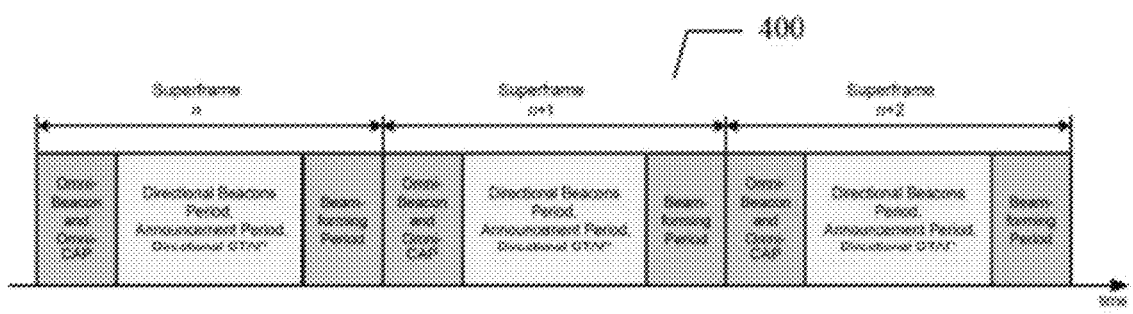
FIG. 4 illustrates several superframes when the beamforming period is placed at the end of a superframe according to one embodiment of the present invention.

But if the beamforming period is placed after the Directional CTAP then this beamforming period is adjacent to the omni-beacon period of the next superframe as it can be seen from FIG. 4. In this case the omni-directional transmission periods (omni-beacon, omni-CTAP and beamforming periods) change to directional transmission periods (directional beacons and Directional CTAP) only once during the superframe. If the beamforming period is placed after the directional beacon (see FIG. 3) period then the there are two changes from the directional transmission modes to the omni-directional transmission modes within the same superframe.

The transmission during the omni-directional mode is performed to all space directions. So there is a higher probability that interference will be created to other DEVs in the neighboring piconets. Oppositely, the probability of creating interference to other devices during the directional transmission mode is significantly below than for the omni-directional mode. So the minimum number of transitions from omni-directional to directional modes within the superframe in the given piconet may help the other piconets to adapt spatial reuse schemes to the interference created by the given piconet.

The selection of the Beamforming period placement may be made by the PNC depending on different factors, for example, on deployment environment. For the office (enterprise) deployment it may be more beneficial to improve the spatial reuse between the piconets and to place the Beamforming period at the end of the superframe. Oppositely in the home (residential) deployment the problem of the spatial reuse between piconets may not be so important and the Beamforming period may be placed after the Announcement period to improve latency performance.

7. Directional CTAP

The Directional Channel Time Allocation Period (CTAP) is used as a normal CTAP in IEEE 802.15.3 systems. All transmissions during the Directional CTAP are'done in the directional high-rate mode. The spatial reuse mechanism may be applied during the Directional CTAP.

8. Dynamic Bandwidth Reservation Mechanism

There may be a situation when not all the time slots available for the Directional CTAP will be allocated. In this case, it is desirable to have a mechanism of the dynamic bandwidth reservation of such free (unallocated) time slots. This may improve the latency performance of the network especially for the long superframes and the bursty data traffic.

Figure 5:
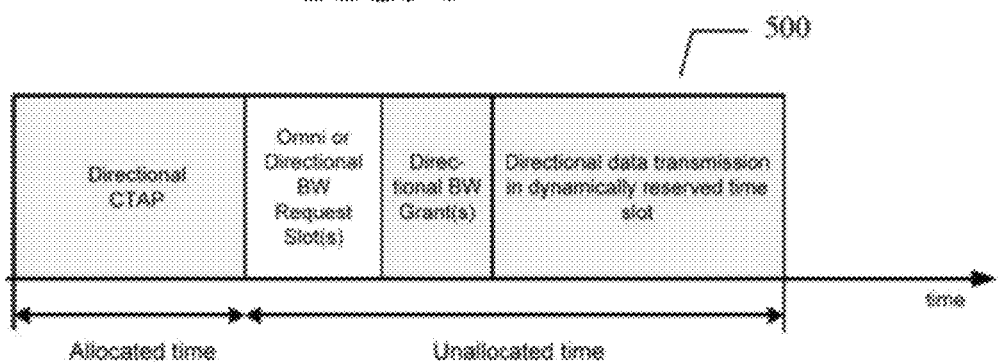
FIG. 5 illustrates a frame format structure for dynamic bandwidth reservation mechanisms according to one embodiment of the present invention.

To address this issue, the dynamic bandwidth reservation mechanism proposed was adopted for the current frame format proposal. The frame format structure for this mechanism is shown in FIG. 5 at 500.

For the proposed dynamic bandwidth reservation mechanism, the DEVs urgently requiring to transmit data should send a BW request in one the BW request slots. In the omni-directional mode, the request slots are contention-based while in the directional mode each device is pre-allocated a dedicated slot by the PNC. The BW request slots are announced by the PNC in the directional beacons. After the reception of the requests for the usage of the unallocated time slots, the PNC grants channel time to the requesting DEVs and announces the schedule for the usage of the unallocated time in the BW grant frames sent to the requesting DEVs in the directional mode. After that, the DEVs start using the unallocated time slots according to the BW grants in the high-rate directional mode.

In summary, embodiments of the present invention may provide a superframe format that allows effective practical realization of the proposed concept with the minimum number of transmissions in the Omni-directional low-rate mode and performing the most of transmissions in the high-rate directional mode. Further, the proposed superframe format allows effective implementation of the novel techniques for the mmWave WPAN with directional steerable antennas such as dynamic bandwidth reservation and spatial reuse.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
one or more transceivers operable to communicate in a wireless network by using a low-rate omni directional mode and a high rate directional millimeter wave (mm wave) communications mode with beamformed antennas, wherein the wireless network is a wireless personal area network (WPAN) and wherein the WPAN is a piconet that includes a central station, and other station devices; and
wherein said one or more transceivers use the low-rate omni-directional communications mode to send an omni directional beacon frame, and a message indicating a loss of a connection in the high rate directional communications mode.

2. The apparatus of claim 1, wherein the one or more transceivers use the low-rate omni-directional communications mode to repeatedly send omni directional beacon frames.

3. The apparatus of claim 1, wherein the low rate omni directional mode is implemented with one antenna element.

4. The apparatus of claim 1, wherein the low rate omni directional mode is implemented as TX-RX space scanning using directional antennas.

5. The apparatus of claim 1, wherein said wireless network employs consecutive in time super frames for said high rate directional communications mode.

6. A method, comprising:
communicating in a wireless network using a low-rate omni directional mode and a high rate directional millimeter wave (mm wave) communications mode, wherein the wireless network is a wireless personal area network (WPAN) and wherein the WPAN is a piconet that includes a central station and other station devices;
using the low-rate omni-directional communications mode to send an omni directional beacon frame; and
using the low-rate omni-directional communications mode to send a message indicating a loss of a connection in the high rate directional communications mode.

7. The method of claim 6, wherein said wireless network employs consecutive in time super frames for said high rate directional communications mode.

8. The method of claim 6, comprising using the low-rate omni-directional communications mode to repeatedly send omni directional beacon frames.

9. The method of claim 6, comprising implementing the low rate omni directional mode is implemented with one antenna element.

10. The method of claim 6, comprising implementing the low rate omni directional mode as TX-RX space scanning with directional antennas.

11. A non-transitory machine-accessible medium that provides instructions, which when accessed, cause a machine to perform operations comprising:
communicating in a wireless network using a low-rate omni directional mode and a high rate directional millimeter wave (mm wave) communications mode, wherein the wireless network is a wireless personal area network (WPAN) and wherein the WPAN is a piconet that includes a central station and other station devices;
using the low-rate omni-directional communications mode to send an omni directional beacon frame; and
using the low-rate omni-directional communications mode to send a message indicating a loss of a connection in the high rate directional communications mode.

12. The non-transitory machine-accessible medium of claim 11, wherein said wireless network employs consecutive in time super frames for said high rate directional communications mode.

13. The non-transitory machine-accessible medium of claim 11, wherein the operations further comprise using the low-rate omni-directional communications mode to repeatedly send omni directional beacon frames.

14. The non-transitory machine-accessible medium of claim 11, wherein the operations further comprise implementing the low rate omni directional mode is implemented with one antenna element.

15. The non-transitory machine-accessible medium of claim 11, wherein the operations further comprise implementing the low rate omni directional mode as TX-RX space scanning with directional antennas.

* * * * *